2,745,806
LIQUID FIRE EXTINGUISHING COMPOSITION

Charles Anthony, Jr., East Orange, and Robert Thomann, Jr., Clifton, N. J., assignors to Specialties Development Corporation, Belleville, N. J., a corporation of New Jersey No Drawing. Application July 29, 1954,
Serial No. 446,656

6 Claims. (Cl. 252—2)

The present invention relates to fire extinguishing compositions, and, more particularly, to fire extingushing compositions consisting of salts in aqueous solution.

It has been found that such compositions can be used to good advantage to extinguish fires or to prevent fires by acting as a coolant for parts likely to be contacted by flammable materials. Preferably, these compositions are discharged under gaseous pressure as fine streams or atomized sprays which are effective to provide for efficient cooling and/or extinguishment.

It is known that the cooling and extinguishing effectiveness of such compositions depends on the concentration thereof, that is, the salt content in solution, and, for this reason, it has been proposed to use either zinc chloride or magnesium chloride which respectively have been reported to have a solubility of 209 and 281 parts by weight in 100 parts by weight of water at 32° F.

One of the requirements of such solutions, in order to be approved for use at locations where low temperatures predominate and water for fire fighting purposes is not available, is that they must be able to withstand extreme temperature changes. For example, if such compositions are exposed to the sun, they may be heated to 120° F. or higher; and, at other times the compositions may be cooled to sub-zero temperatures. Consequently, specifications have been established which require that these compositions are serviceable as a freely flowing liquid adapted for discharge as fine streams or atomized sprays within the temperature range of —65° to 165° F., and that these compositions are capable of withstanding changes in temperature from one extreme to the other within this range.

In order to assure the free flow of such solutions and the formation of fine streams or atomized sprays therefrom at —65° F., it has been found that compositions which do not freeze or which remain in a not too viscous liquid state at a much lower temperature, for example —85° F., are safe for use at temperatures of —65° F. and slightly lower.

Accordingly, the primary object of the present invention is to provide such aqueous solutions which meet the foregoing specifications and requirements.

Another object is to provide such solutions which have a salt content of between 50% and 60% by weight of the composition and which can be discharged as fine streams and atomized sprays at —85° F.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been found that aqueous solutions consisting of water and from 50% to 60% by weight of a salt mixture which consists of from 40% to 55% of zinc chloride by weight of the composition and from 20% to 5% of hydrated magnesium chloride by weight of the composition did not freeze or remained in a not too viscous liquid state at —86° F. and were suitable for discharge in fine streams or atomized sprays at —65° F. and slightly lower.

On the other hand, it was found that compositions consisting of water and 50% of zinc chloride by weight dissolved therein became too viscous for proper handling thereof at about —65° F.; and that compositions consisting of water and 50% of hydrated magnesium chloride, $MgCl_2.6H_2O$, by weight dissolved therein solidified at —35° F., thus demonstrating that mixtures of these salts can be used in higher concentration than either thereof alone.

Also, compositions consisting of water and from 55% to 75% of zinc chloride by weight of the composition were unfit for use at —65° F. Compositions containing 55% and 60% of zinc chloride became too viscous to be discharged as fine streams or atomized sprays at —65° F. A composition containing 65% of zinc chloride was very viscous at —54° F., and compositions containing 70% and 75% of zinc chloride salted out at —13° F. and —2° F., respectively.

The following examples illustrate specific compositions in accordance with the present invention, all percentages being by weight:

| Example | Water, percent | Zinc Chloride, percent | Hydrated Magnesium Chloride, percent |
|---|---|---|---|
| 1 | 50 | 45 | 5 |
| 2 | 45 | 50 | 5 |
| 3 | 40 | 55 | 5 |
| 4 | 50 | 40 | 10 |
| 5 | 45 | 45 | 10 |
| 6 | 40 | 50 | 10 |
| 7 | 45 | 40 | 15 |
| 8 | 40 | 45 | 15 |
| 9 | 40 | 40 | 20 |

All of these compositions were in a usable fluid state at —86° F., and were discharged as fine streams or atomized sprays by gas under pressure at such temperature.

The proportions of materials of the foregoing compositions (Examples 1 to 9) are believed to be critical in view of the fact that the desired results could not be attained with compositions in accordance with the following examples:

| Example | Water, percent | Zinc Chloride, percent | Hydrated Magnesium Chloride, percent | F. P., °F. |
|---|---|---|---|---|
| 10 | 55 | 40 | 5 | —36 |
| 11 | 55 | 30 | 15 | —18 |
| 12 | 50 | 30 | 20 | —31 |
| 13 | 50 | 25 | 25 | —26 |
| 14 | 45 | 35 | 20 | —58 |
| 15 | 40 | 35 | 25 | —64 |
| 16 | 40 | 30 | 30 | —57 |

In order to demonstrate the serviceability of the compositions in accordance with Examples 1 to 9 at sub-zero temperatures, water-type fire extinguishers were charged with the respective compositions and were pressurized to 200 pounds per square inch with nitrogen. The extinguishers were maintained at between —65° F. and —70° F. for twenty-four hours, and the compositions therein were discharged as a fluid stream at such temperatures through a nozzle adapted to form fine streams or atomized sprays. The compositions were found to be effective to cool hot surfaces to prevent the ignition of aircraft gasoline upon coming in contact therewith and to extinguish fires.

Other tests were made in connection with these compositions in open containers by subjecting the same to the aforementioned temperatures for a period of about seventy-two hours. At the end of this treatment, it was found that in each case the compositions did not salt out, poured about as freely as fresh water, and did not exhibit viscous tendencies. This accounts for the fact that rapid and efficient discharge thereof can be effected as previously mentioned.

Still further tests were made to demonstrate the stability of these compositions to rapid temperature changes by subjecting the same to three cycles of alternately heating the compositions to 165° F. and cooling the same to —65° F. The compositions did not exhibit any change in physical characteristics which would impair discharge thereof in the aforementioned manner.

It will be understood that the details and examples hereinbefore set forth are illustrative only and that the invention as broadly described and claimed is in no way limited thereby.

This application is a continuation-in-part of application for Letters Patent of the United States, Serial No. 324,402 filed December 5, 1952, issued on even date herewith.

We claim:

1. An aqueous fire extinguishing and fire preventing composition consisting of water and from 50% to 60% by weight of the composition of a salt mixture dissolved in the water, said mixture consisting of from 40% to 55% by weight of the composition of zinc chloride and from 20% to 5% by weight of the compositions of hydrated magnesium chloride.

2. An aqueous fire extinguishing and fire preventing composition consisting of 50% by weight of water, 45% by weight of zinc chloride, and 5% by weight of hydrated magnesium chloride.

3. An aqueous fire extinguishing and fire preventing composition consisting of 40% by weight of water, 55% by weight of zinc chloride, and 5% by weight of hydrated magnesium chloride.

4. An aqueous fire extinguishing and fire preventing composition consisting of 50% by weight of water, 40% by weight of zinc chloride, and 10% by weight of hydrated magnesium chloride.

5. An aqueous fire extinguishing and fire preventing composition consisting of 45% by weight of water, 45% by weight of zinc chloride, and 10% by weight of hydrated magnesium chloride.

6. An aqueous fire extinguishing and fire preventing composition consisting of 40% by weight of water, 40% by weight of zinc chloride, and 20% by weight of hydrated magnesium chloride.

References Cited in the file of this patent

UNITED STATES PATENTS

| | | |
|---|---|---|
| 1,017,949 | Breslauer | Feb. 20, 1912 |
| 1,633,383 | Kubierschky | June 21, 1927 |

FOREIGN PATENTS

| | | |
|---|---|---|
| 115,998 | Australia | Feb. 11, 1943 |